(12) United States Patent
Egan et al.

(10) Patent No.: US 6,452,735 B1
(45) Date of Patent: *Sep. 17, 2002

(54) DISK DRIVE THAT MONITORS THE FLYING HEIGHT OF A DUAL ELEMENT TRANSDUCER USING A THERMALLY INDUCED SIGNAL DURING WRITE OPERATIONS

(75) Inventors: Curtis Egan, Thornton, CO (US); Gang Herbert Lin, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/357,094

(22) Filed: Jul. 19, 1999

(51) Int. Cl.[7] .................. G11B 27/36; G11B 21/02; G11B 5/02; G11B 5/09; G11B 19/04
(52) U.S. Cl. .................. 360/31; 360/25; 360/75; 360/53; 360/60
(58) Field of Search .................. 360/25, 31, 60, 360/66, 53, 75

(56) References Cited

U.S. PATENT DOCUMENTS

| 4,669,011 | A | * | 5/1987 | Lemke ................. 360/75 |
| 4,703,378 | A | | 10/1987 | Imakoshi et al. ........ 360/113 |
| 4,777,544 | A | | 10/1988 | Brown et al. ............ 360/75 |
| 5,082,827 | A | | 1/1992 | Barnes ................... 505/1 |
| 5,130,866 | A | | 7/1992 | Klaassen et al. ......... 360/75 |
| 5,168,413 | A | | 12/1992 | Coker et al. ............ 360/137 |
| 3,979,775 | A | | 11/1993 | Schwarz ................. 360/113 |
| 5,260,836 | A | | 11/1993 | Yada et al. ............. 360/63 |
| 5,309,295 | A | | 5/1994 | Bailey et al. ........... 360/66 |
| 5,377,058 | A | | 12/1994 | Good et al. ............. 360/75 |
| 5,410,439 | A | | 4/1995 | Egbert et al. ........... 360/75 |
| 5,412,519 | A | | 5/1995 | Buettner et al. ......... 360/73.03 |
| 5,436,773 | A | | 7/1995 | Hanson .................. 360/66 |
| 5,461,517 | A | | 10/1995 | Suda et al. ............. 360/66 |
| 5,909,330 | A | | 6/1999 | Carlson et al. .......... 360/31 |
| 6,088,176 | A | * | 7/2000 | Smith et al. ............ 360/75 X |
| 6,104,557 | A | * | 8/2000 | Kasai et al. ............ 360/46 |
| 6,104,563 | A | * | 8/2000 | Dovek et al. ............ 360/66 |
| 6,130,793 | A | * | 10/2000 | Ohmori et al. ........... 360/53 |
| 6,216,242 | B1 | * | 4/2001 | Schaenzer .............. 714/723 |

* cited by examiner

Primary Examiner—Andrew L. Sniezek
(74) Attorney, Agent, or Firm—David M. Sigmond

(57) ABSTRACT

A disk drive that monitors changes in flying height is disclosed. In one embodiment, the disk drive includes a disk for storing information and an air bearing slider with a transducer that includes a write element for writing information to the disk during a write operation and a magnetoresistive (MR) read element for reading information from the disk during a read operation. The MR read element generates a readback signal during the write operation that includes a thermally induced signal caused by thermal changes in the MR read element and a magnetically induced signal caused by magnetic flux applied by the write element to the MR read element. The thermally induced signal has a relatively low frequency content and the magnetically induced signal has a relatively high frequency content. The disk drive also includes a low pass filter for receiving the readback signal and isolating the thermally induced signal from the magnetically induced signal, a threshold detector for receiving the thermally induced signal from the filter and generating a high fly write detection signal when the thermally induced signal exceeds a threshold value, and a controller for modifying the write operation in response to the high fly write detection signal.

60 Claims, 6 Drawing Sheets

DISK DRIVE THAT MONITORS THE FLYING HEIGHT OF A DUAL ELEMENT TRANSDUCER USING A THERMALLY INDUCED SIGNAL DURING WRITE OPERATIONS

FIELD OF THE INVENTION

The present invention relates to digital storage devices and, more particularly, to disk drives which monitor the flying height of dual element transducers that employ magneto-resistive (MR) read elements.

BACKGROUND OF THE INVENTION

A disk drive is a digital data storage device that stores information within concentric tracks on a storage disk. The storage disk is coated on both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the transducer while the transducer is positioned above (or below) the desired track. The write signal creates a variable magnetic field at a gap portion of the transducer that induces magnetically polarized transitions into the desired track. The magnetically polarized transitions are representative of the data being stored.

Reading is performed by sensing the magnetically polarized transitions on a track with the transducer. As the disk spins below (or above) the transducer, the magnetically polarized transitions on the track induce a varying magnetic field into the transducer. The transducer converts the varying magnetic field into an analog read signal that is delivered to a preamplifier and then to a read channel for appropriate processing. The read channel converts the analog read signal into a digital signal that is processed and then provided by a controller to a host computer system.

FIG. 1 illustrates a standard disk drive, generally designated 10. The disk drive 10 includes a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22, which is attached to an actuator arm 24 that can rotate about a bearing assembly 26. The actuator arm assembly 18 includes a voice coil motor (VCM) 28, which radially positions the transducer 20 relative to the disk 12. The spin motor 14, transducer 20 and VCM 28 are coupled to electronic circuits 30 mounted to a printed circuit board 32. The electronic circuits 30 typically include a preamplifier, a read channel, a servo control unit, a microprocessor-based controller and a random access memory (RAM).

The disk drive 10 may include a plurality of disks 12, each with two recording surfaces. In this case, two actuator arm assemblies 18 are provided for each disk 12.

The transducer 20 is a dual element transducer that includes separate read and write elements. Single element transducers usually contain a single inductive element that performs both read and write functions, whereas dual element transducers usually contain a magneto-resistive (MR) read element and an inductive write element. The MR read element can be a conventional magneto-resistive element, a giant magneto-resistive (GMR) element, or a similar component.

Since the transducer 20 is a dual element transducer, the read and write elements can be optimized for their respective functions. For example, MR read elements are more sensitive than inductive read elements to small variable magnetic fields, which permits MR read elements to read much fainter signals from the disk surface. Employing an MR read element permits data to be more densely packed on the disk surface.

MR read elements generally include a strip of magneto-resistive material between two magnetic shields. When properly biased, the resistance of the magneto-resistive material varies almost linearly with an applied magnetic field. During a read operation, the MR strip is positioned above (or below) a desired track within the varying magnetic field caused by magnetic transitions on the track and a constant bias current is passed through the strip. By Ohm's law (V=IR), the variable resistance and the constant bias current of the MR strip result in a variable voltage across the MR strip that is proportional to the variable resistance. That is, V+δV=I(R+δR). Therefore, the variable voltage is representative of the data stored within the desired track. The variable voltage provides an analog read signal which is then amplified by the preamplifier, processed and converted into digital form by the read channel, and transferred by the controller to a host computer.

FIG. 2 is a diagrammatic representation of an air bearing surface of the transducer 20 which faces the disk 12. As is seen, the transducer 20 includes an inductive write element 34, a write gap 36, a first shield 38, a second shield 40, a read gap 42, and an MR read element 44.

During a read operation, the magnetically polarized transitions previously written onto the disk 12 are read by the MR read element 44. The first and second shields 38 and 40 form the read gap 42 which serves to focus the flux from the magnetically polarized transitions onto the MR read element 44 by shielding the MR element 44 from other sources of magnetic flux (e.g., sources of magnetic flux not associated with the particular location from which information is being read). In other words, the first and second shields 38 and 40 shunt extraneous magnetic flux away from the MR read element 44 as reading occurs.

During a write operation, variable current is applied to write coils (not shown) in the transducer 20 which induce magnetic flux across the write gap 36 between the write element 34 and the first shield 38. The write element 34 and first shield 38 act as poles for an electromagnet which induces the magnetic flux across the write gap 36 that records magnetically polarized transitions on the disk 12. Furthermore, since the magnetic flux in the write gap 36 has relatively high intensity, and the MR read element 44 is in close proximity to the write gap 36, a large amount of the magnetic flux across the write gap 36 strikes the MR read element 44 during a write operation. Consequently, the MR read element 44 is typically not used to read data from the disk 12 during a write operation.

FIG. 3 is a simplified diagrammatic representation of a cross-sectional view of an air bearing slider 46 that includes the transducer 20 flying above a disk surface 48 of the disk 12. The slider 46 is located at the distal end (opposite VCM 28) of the actuator arm assembly 18. The slider 46 includes a leading edge 50 and a trailing edge 52. The transducer 20 is located proximate the trailing edge 52.

During operation of the disk drive 10, the disk 12 is rotated in the direction of arrow A from the leading edge 50 to the trailing edge 52. The slider 46 is aerodynamically designed so that when the disk 12 revolves at its normal operating speed, a small cushion of air between the slider 46 and the disk surface 48 lifts the slider 46 (and hence the transducer 20) a predetermined distance above the disk surface 48. The distance between the transducer 20 and the disk surface 48 is known as the flying height ($h_f$) of the transducer 20. The performance of the disk drive 10 will depend, to a large extent, on whether the flying height of the transducer 20 stays within a predetermined flying height range. For instance, if the flying height of transducer 20 is too low then transducer 20 might crash, engage in excessive contact with the disk surface 48 resulting in damage to the transducer 20 and/or disk 12, or accumulate excessive debris or lubricant from disk surface 48. On the other hand, if the flying height of transducer 20 is too high then data errors might occur during read and write operations. More particularly, if the transducer 20 flies too high during a read operation then the transducer 20 might not adequately sense the magnetic polarity transitions on the disk 12, and if the transducer 20 flies too high during a write operation then the transducer 20 might not adequately induce the magnetic polarity transitions onto the disk 12.

There are two main causes of unwanted changes in flying height. First, the slider 46 may strike contaminants 54 on the disk surface 48 which temporarily stick to the slider 46 and change its aerodynamic characteristics. Second, the slider 46 may strike and bounce off contaminants 54 or aberrations 56 in the disk surface 48. In addition, the flying height may change for other reasons. For instance, gradual accumulation of debris onto the slider 46 can increase the flying height.

As mentioned above, unexpected changes in flying height can result in performance and/or reliability degradation of the disk drive 10. The present invention is directed to alleviating the problem of high fly writing which occurs when the disk drive 10 performs a write operation while the transducer 20 flies too high.

FIG. 4 is a simplified diagrammatic representation of a cross-sectional view of the slider 46 during high fly writing. As is seen, the flying height ($h_f$) of the transducer 20 exceeds a predetermined maximum flying height ($h_{max}$) by a distance x. In other words, $h_f = h_{max} + x$. Since the write element 34 is higher than the predetermined maximum flying height, the magnetically polarized transitions (data) written onto the disk surface 48 are faintly or poorly written. Consequently, the poorly written data is not properly read by the MR read element 44 when such data is sought to be recovered. In addition, since the write element 34 is higher than the predetermined maximum flying height, the write element 34 may also write over parts of tracks adjacent to the track onto which the data is sought to be written. This may render previously written data on the adjacent tracks to be unreadable.

For a more complete understanding of the present invention, a discussion of thermally induced signals in MR read elements is presented. The resistance of MR read elements varies not only in response to an applied magnetic field, but also in response to temperature changes. That is, the resistance of the MR read element is temperature dependent. Accordingly, an increase in the temperature ($T+\delta T$) of the MR read element increases the resistance ($R+\delta R$) of the MR read element. Since the analog read signal (in volts) is proportional to the resistance of the MR read element, increasing the temperature of the MR read element causes the analog read voltage to increase.

There are several known phenomena that cause thermally induced signals in MR read elements during disk drive operations. For instance, when the MR read element 44 strikes contaminants 54 or aberrations 56 on the disk surface 48, the temperature of MR read element 44 rises and creates a thermally induced signal known as a thermal asperity. As another example, the bias current that flows through the MR read element 44 increases the temperature of the MR read element 44, however the disk 12 operates at essentially the ambient temperature. As a result, the disk 12 provides a heat sink for the MR read element 44. The ability of the disk 12 to draw heat from the MR read element 44 is related to the distance between the disk 12 and the MR read element 44. Therefore, as the flying height of the MR read element changes, the temperature of the MR read element 44 also changes, which causes a thermally induced signal in the MR read element 44.

Conventional disk drives monitor thermal asperities during read operations in order to prevent read errors. For instance, the detection of a thermal asperity during a read operation may result in an error recovery operation.

Furthermore, in conventional disk drives, the bias current is applied to the MR read element during read and write operations to ensure that the MR read element is maintained at a relatively steady-state temperature to avoid unwanted thermally induced signals during the read operation.

However, in conventional disk drives with dual element transducers, the MR read element is often in close proximity to the write element and not used to read data from the disk during a write operation due to interference from the magnetic flux generated by the write element during the write operation. In other words, the MR read element would be disrupted in its normally useable frequency range by the magnetic fields generated by the write element, which would prevent the MR read element from providing an analog read signal indicative of data being read from the disk.

Accordingly, a need exists for a disk drive with a dual element transducer that monitors flying height during a write operation so that appropriate measures can be taken when high fly writing occurs.

SUMMARY OF THE INVENTION

In accordance with the invention, a flying height monitoring system is disclosed. Generally speaking, the present invention monitors the flying height of a dual element transducer by monitoring a thermally induced signal generated by the read element during a write operation. The thermally induced signal can be separated from a magnetically induced signal using a filter. For instance, data storage systems with sufficiently high data transfer rates create magnetically induced signals with higher frequency contents than thermally induced signals. In this instance, a low pass filter coupled to the read element can isolate the thermally induced signal from the magnetically induced signal, and a detector coupled to the filter can determine whether the thermally induced signal exceeds a threshold value. If the thermally induced signal exceeds the threshold value, the detector can send a warning signal to a controller so that appropriate measures, such as repeating the write operation, can be taken.

In one embodiment, a flying height monitoring system includes a recording media for storing information, a transducer including a write element for writing information to the recording media and a read element for reading information from the recording media, and a monitoring circuit for monitoring a thermally induced signal generated by the read element while the write element is writing information to the recording media.

In another embodiment, a disk drive includes a disk for storing information and an air bearing slider with a transducer that includes a write element for writing information to the disk during a write operation and a magneto-resistive (MR) read element for reading information from the disk during a read operation. The MR read element generates a readback signal during the write operation that includes a thermally induced signal caused by thermal changes in the MR read element and a magnetically induced signal caused by magnetic flux applied by the write element to the MR read element. The disk drive also includes a filter for receiving the readback signal and isolating the thermally induced signal from the magnetically induced signal, a threshold detector for receiving the thermally induced signal from the filter and generating a high fly write detection signal when the thermally induced signal exceeds a threshold value, and a controller for modifying the write operation in response to the high fly write detection signal.

Preferably, the thermally induced signal has a frequency content of at most 3 MHz, the magnetically induced signal has a frequency content of at least 5 MHz, and the filter is a low pass filter. The thermally induced signal can be a thermal asperity which occurs when the transducer strikes an object, such as contamination or an aberration on the disk. Alternatively, the thermally induced signal can occur due to a change in flying height when the disk provides a heat sink for the transducer.

In accordance with another aspect of the invention, the controller stores a first set of data related to the thermally induced signal provided by the MR read element at a first time during normal operation of the disk drive, the controller stores a second set of data related to the thermally induced signal provided by the MR read element at a second time during normal operation of the disk drive, and the controller compares the first and second sets of data to determine whether debris has accumulated on the transducer. In the event the controller determines that debris has accumulated, the controller can issue a command that causes the transducer to vibrate in an effort to shake off the accumulated debris, or alternatively, the controller can notify a user.

These and other objects, features and advantages of the invention will be apparent from the following specification taken in conjunction with the following drawings.

DETAILED DESCRIPTION OF THE PREFERRED EMBODIMENT

Figure 1:
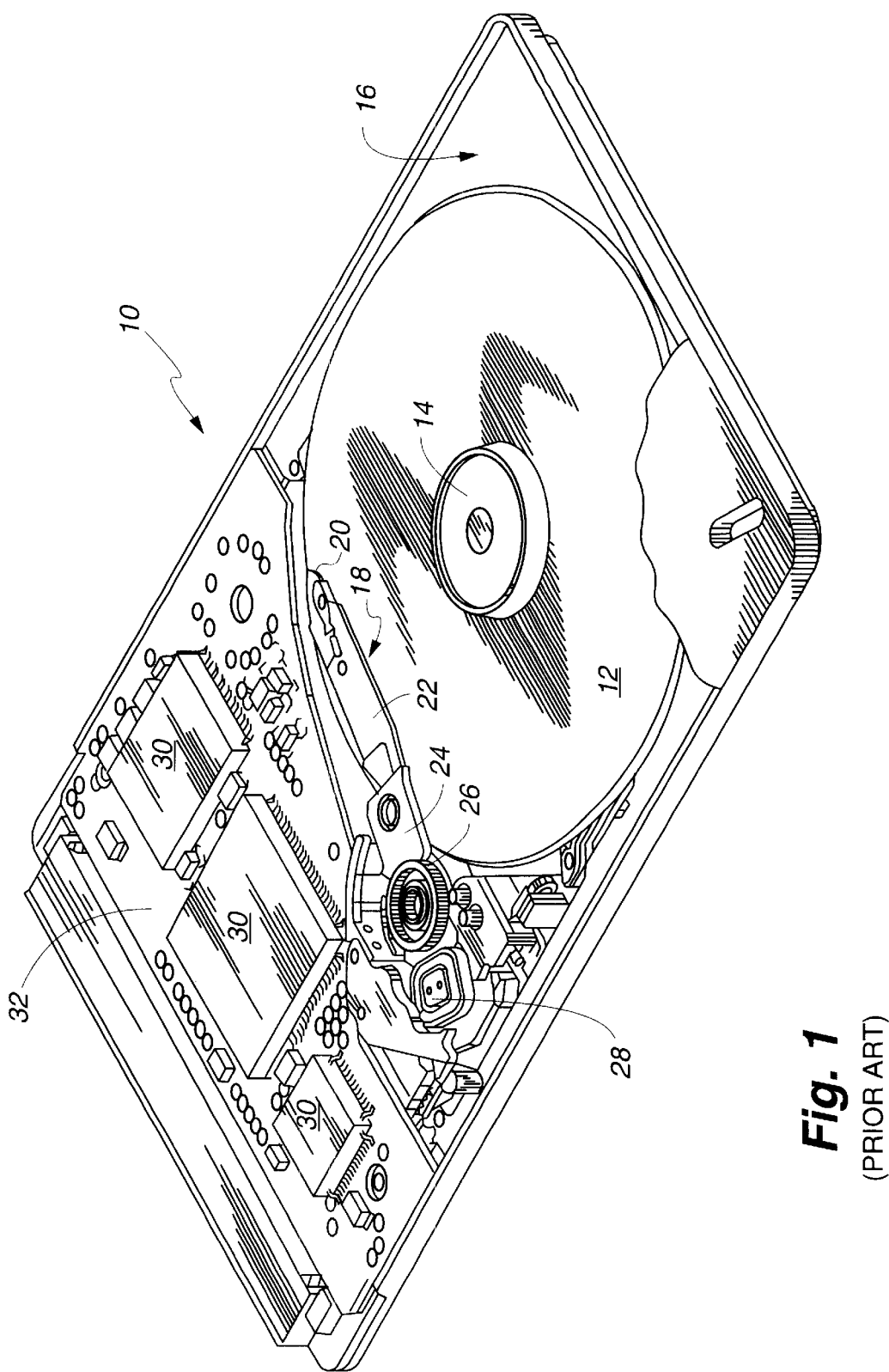
FIG. 1 is a perspective view of a standard disk drive.
Figure 2:
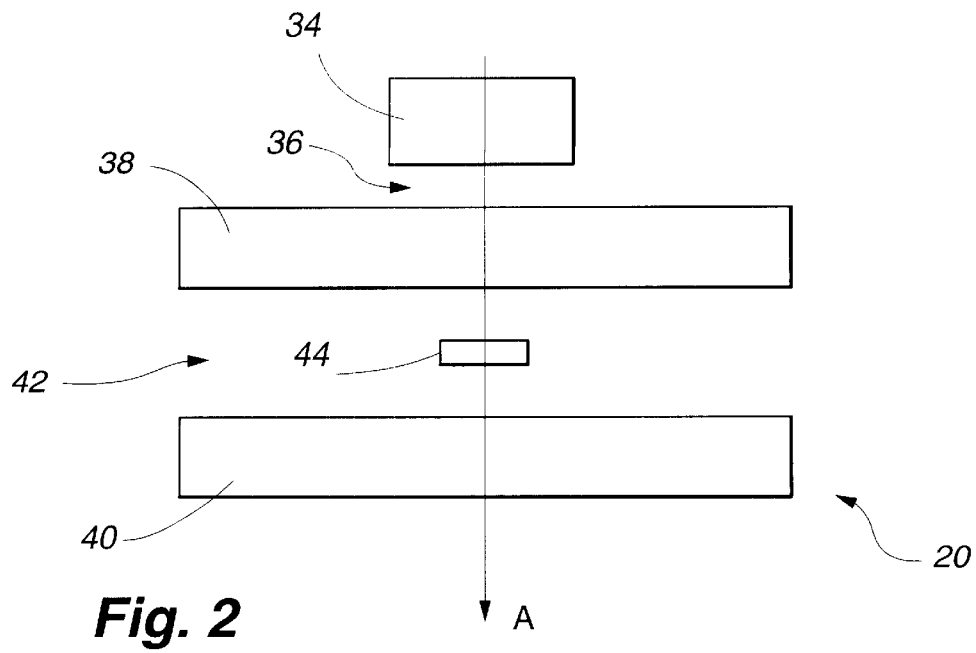
FIG. 2 is a diagrammatic representation of an air-bearing surface of a transducer.
Figure 3:
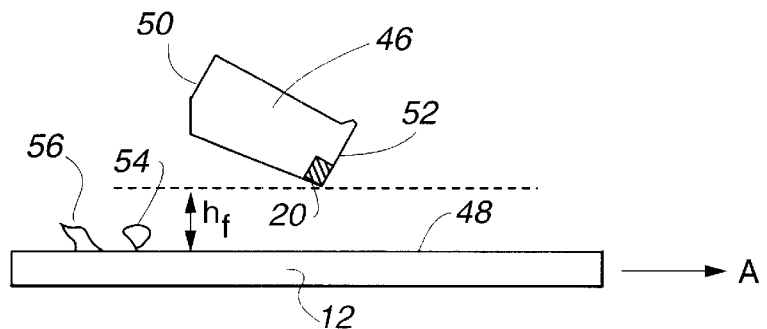
FIG. 3 is a simplified diagrammatic representation of a slider flying over a disk surface.
Figure 4:
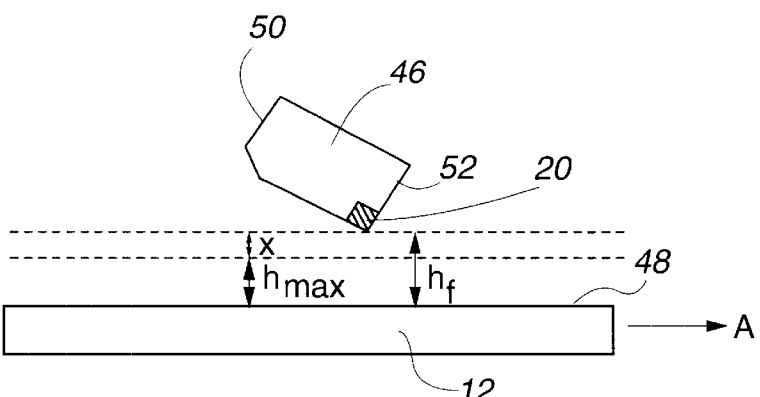
FIG. 4 is a simplified diagrammatic representation of a slider flying too high over a disk surface.
Figure 5:
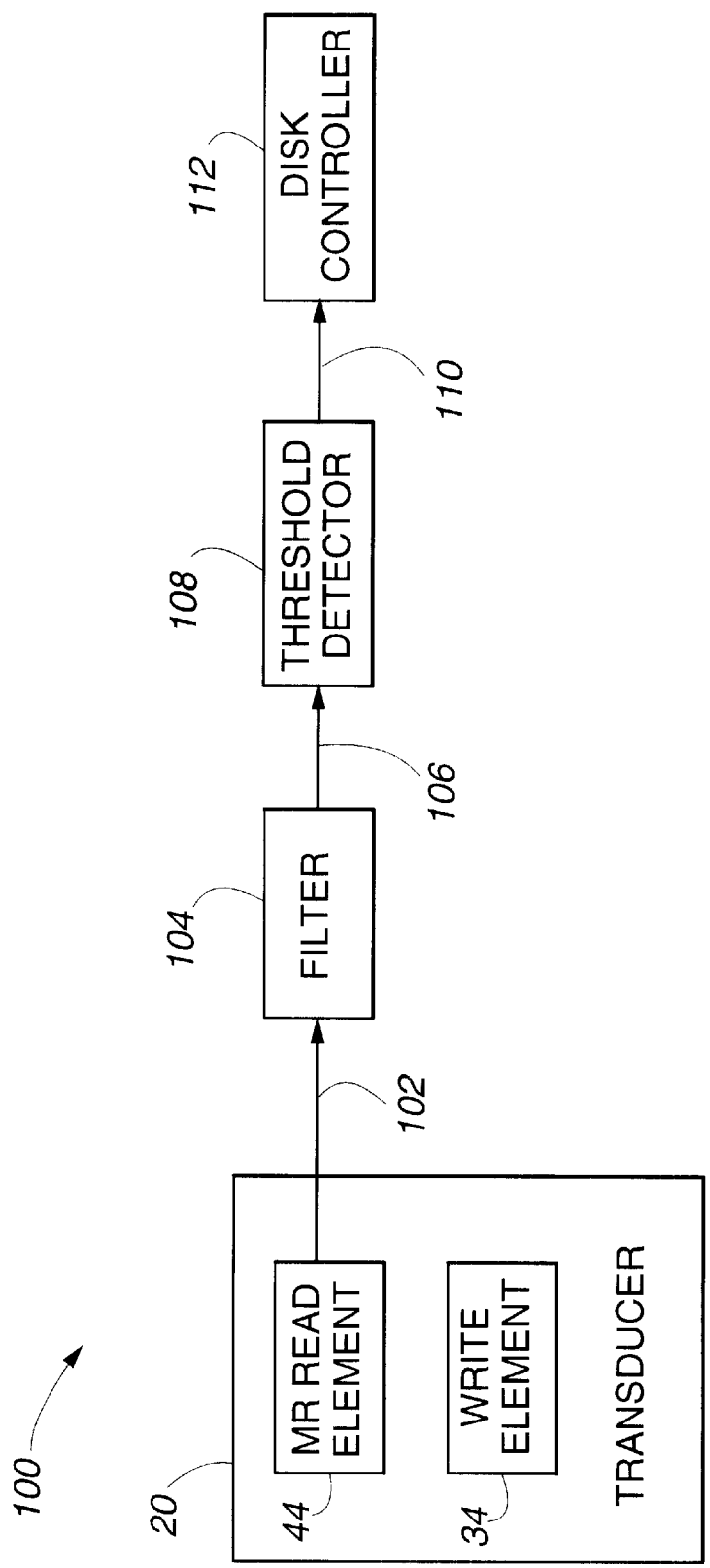
FIG. 5 is a block diagram of the flying height monitoring system of the present invention.

FIG. 5 is a block diagram of the flying height monitoring system, generally designated 100, which monitors the flying height of the transducer 20 during a write operation in accordance with the present invention. The system 100 includes the transducer 20 that contains the write element 34 and the MR read element 44. During a write operation, the MR read element 44 generates a readback signal, which is an analog voltage signal, at line 102. The readback signal includes a thermally induced signal with a relatively low frequency content and a magnetically induced signal with a relatively high frequency content. The thermally induced signal is caused by temperatures changes of the MR read element 44, and the magnetically induced signal is caused by magnetic flux in the MR read element 44 generated by the write element 34 to record data on the disk 12. System 100 also includes a filter 104 for receiving the readback signal and filtering out the magnetically induced signal to provide the thermally induced signal at line 106, a threshold detector 108 for receiving the thermally induced signal and generating a digital high fly write detection signal at line 110 when the magnitude of the thermally induced signal exceeds a threshold value, and a disk controller 112 for modifying the write operation in response to the high fly write detection signal.

In the transducer 20, the write element 34 and the MR read element 44 are mechanically coupled to one another and fly at roughly the same height above the disk surface 48. In addition, the write element 34 and the MR read element 44 are located in close proximity to one another, and a bias current is applied to the MR read element during the write operation. As a result, during the write operation, the write element 34 generates magnetic flux that not only records magnetic polarity transitions on the disk 12, but also creates the magnetically induced signal in the MR read element 44. The magnetic flux, and ensuing magnetically induced signal, have a frequency content of about 5 MHz.

Furthermore, during the write operation, the MR read element 44 generates a thermally induced signal that arises from temperature changes of the MR read element 44. The thermally induced signal can be a thermal asperity, which occurs when the MR read element strikes an object, such as contamination or an aberration on the surface of the disk 12. The thermally induced signal can also result from changes in flying height of the MR read element 44 since the disk 12 provides a heat sink for the MR read element 44. The frequency content of the thermally induced signal depends on various factors, such as the thermal time constant of the MR read element 44, and in the case of a thermal asperity, the force of the collision or friction between the MR read element 44 and the object it strikes. However, in the system 100, the frequency content of the thermally induced signal is at most 3 MHz, which the inventors believe to be a typical upper limit for thermally induced signals from MR read elements in disk drives.

If the MR read element 44 undergoes a rapid increase in flying height, and therefore has less of its heat absorbed by the disk 12, the rapid temperature increase of the MR read element 44 induces a thermal signal that indicates it is likely (or at least a significant possibility) that the transducer 20 shall fly too high.

It should also be noted that rapid decreases in flying height are often followed by rapid increases in flying height. For instance, if the transducer 20 undergoes a rapid decrease in flying height and strikes an object on the surface of the disk 12, causing a thermal asperity in the MR read element 44, it is likely (or at least a significant possibility) that the transducer 20 shall bounce off the object and fly too high. Likewise, if the transducer 20 undergoes a rapid decrease in flying height and the MR read element 44 rapidly cools due to its close proximity to the disk 12, it is likely (or at least a significant possibility) that the transducer 20 shall bounce off the disk 12 and fly too high.

Accordingly, when the thermally induced signal exceeds a predetermined magnitude during a write operation, this indicates a likelihood, or at least a significant possibility, that a high fly write shall occur. Advantageously, the present invention utilizes this phenomena to take appropriate corrective measures, thereby increasing the reliability and integrity of the write operation.

The filter 104 isolates the relatively low frequency content thermally induced signal from the relatively high frequency content magnetically induced signal. The filter 104 is a low pass filter designed to have a high-frequency cutoff great enough to transfer thermally induced signals, such as thermal asperities, but lower than the frequency content of the magnetic flux reversals used for writing data to the disk 12. In other words, the high-frequency cutoff of the filter 104 is sufficient to discriminate between the low frequency content thermal component and the high frequency content magnetic component of the readback signal. If desired, a bandpass filter may be used instead of a lowpass filter. A Butterworth-type filter having a steep cutoff is preferred as an analog filtering technique. The steep cutoff features of Butterworth-type filters may also be obtained using known digital techniques. The frequency response of the filter 104 may also be programmable using known analog or digital techniques.

Once the thermally induced signal has been separated from the magnetically induced signal by the filter 104, the thermally induced signal at line 106 is applied to the threshold detector 108. The threshold detector 108 compares the magnitude of the thermally induced signal with a predetermined threshold value, which may be programmable, and which is based upon a thermal event that is expected to produce a flying height that exceeds a predetermined maximum value, that is, a high fly write. If the magnitude of the thermally induced signal is greater than the threshold value, the threshold detector 108 generates the fly high write detection signal at line 110. This is accomplished by asserting a logical one at line 110. Otherwise, the threshold detector 108 indicates the absence of high fly write detection by asserting a logical zero at line 110.

Once the threshold detector 108 determines that the magnitude of the thermally induced signal exceeds the threshold value and asserts the high fly write detection signal, the disk controller 112, which is a microprocessor, performs the necessary modifications to the write operation.

Figure 6:
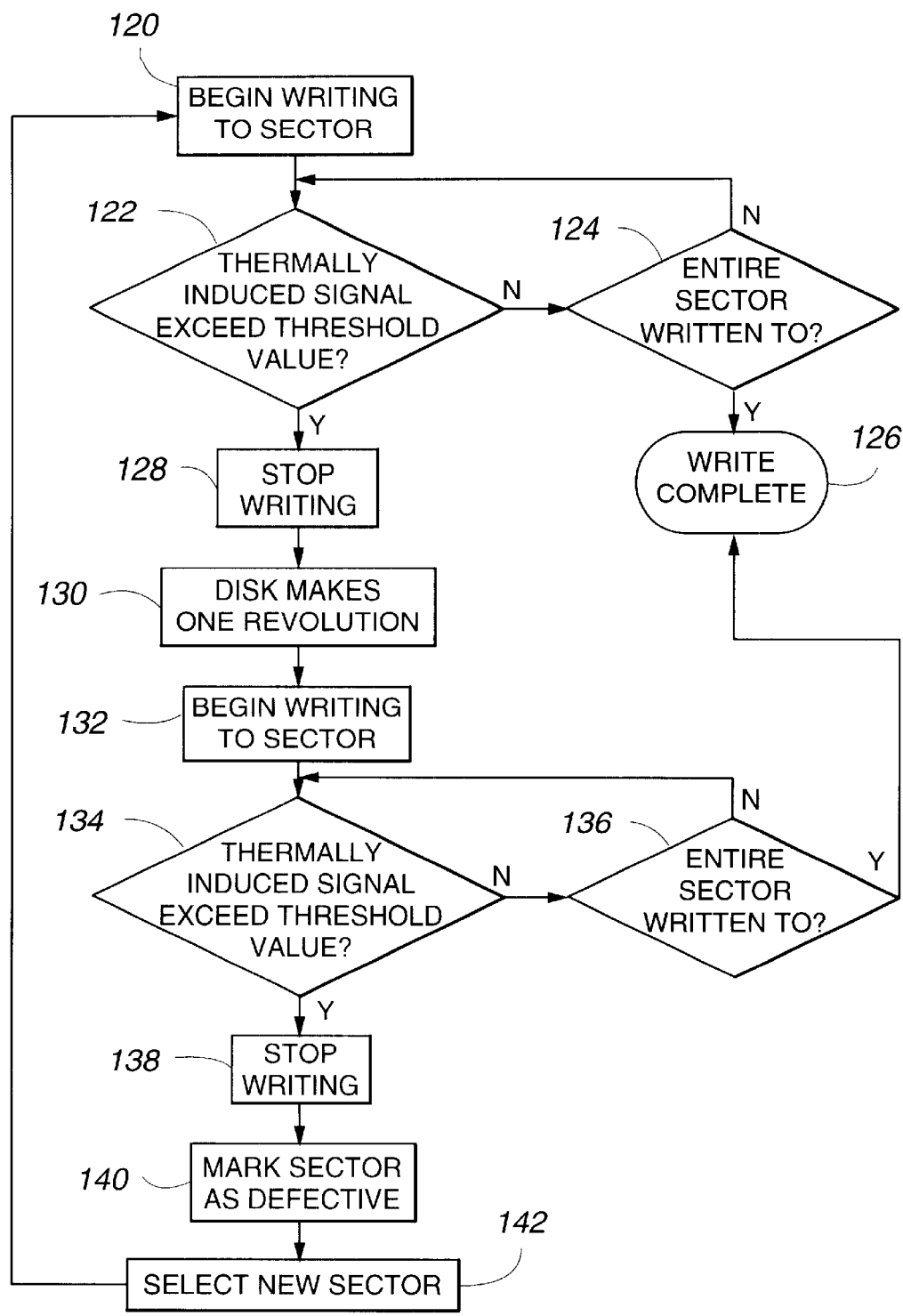
FIG. 6 is a flowchart illustrating an example of modifications to a write operation in response to a high fly write detection signal.
Figure 7:
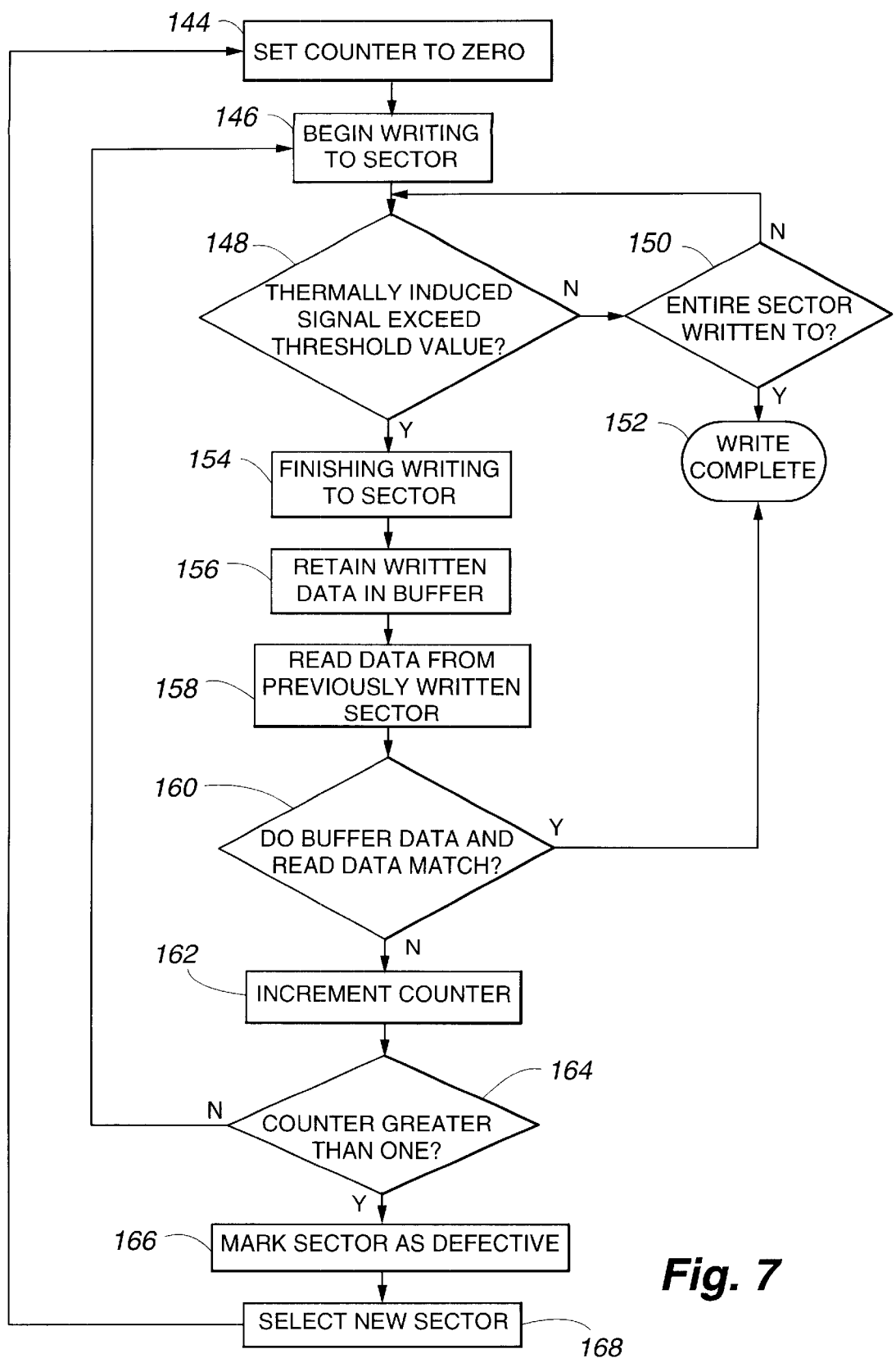
FIG. 7 is a flowchart illustrating another example of modifications to a write operation in response to a high fly write detection signal.

FIGS. 6 and 7 are flowcharts which describe examples of modifications to the write operation that the disk controller 112 performs in response to the high fly write detection signal.

In FIG. 6, in step 120, the write element 34 begins writing to a sector of the disk 12. In decision step 122, the threshold detector 108 determines whether the thermally induced signal exceeds the threshold value. If not, decision step 124 determines whether the entire sector has been written to. If so, decision step 124 branches to completion step 126; if not, decision step 124 branches back to decision step 122. If, on the other hand, in decision step 122, the threshold detector 108 determines that the thermally induced signal exceeds the threshold value, then in step 128 the write element 34 stops writing, in step 130 the disk makes one revolution, and in step 132 the write element 34 begins writing to the same sector. In decision step 134, the threshold detector 108 determines whether the thermally induced signal exceeds the threshold value. If not, decision step 136 determines whether the entire sector has been written to. If so, decision step 136 branches to completion step 126; if not, decision step 136 branches back to decision step 134. If, on the other hand, in decision step 134, the threshold detector 108 determines that the thermally induced signal exceeds the threshold value, then in step 138 the write element 34 stops writing to the sector, in step 140 the sector is marked as defective in a bad sector bit map (in which case the disk drive no longer writes to that sector), in step 142 a new sector is selected, and in step 120 the write operation begins again at the new sector.

In FIG. 7, in step 144, a counter is initialized to zero. In step 146, the write element 34 begins writing to a sector of the disk 12. In step 148, the threshold detector 108 determines whether the thermally induced signal exceeds the threshold value. If not, decision step 150 determines whether the entire sector has been written to. If so, decision step 150 branches to completion step 152; if not, decision step 150 branches back to decision step 148. If, on the other hand, in decision step 148, the threshold detector 108 determines that the thermally induced signal exceeds the threshold value, then in step 154, the write element 34 continues writing data to the disk 12 until the entire sector has been written to, and in step 156, the written data continues to be retained in a buffer memory in the disk controller 112. In step 158, the MR read element 44 reads the data from the sector previously written to, and decision step 160, the read data is compared with the buffer memory data to determine whether or not they match. (Alternatively, if desired, the read verification operation in step 160 can be performed by evaluating the read data with error correction code data stored in the buffer memory.) If the read data and buffer memory data match, decision step 160 branches to completion step 152; if not, decision step 160 branches to step 162 where the counter is incremented, and decision step 164 determines whether the counter is greater than one. If not (in which case less than two unsuccessful attempts have been made to write to the sector), decision step 164 branches to step 146 and another attempt is made at writing to the sector. If, however, the counter is greater than one (in which case two unsuccessful attempts have been made to write to the sector), then in step 166 the sector is marked as defective in a bad sector bit map, in step 168 a new sector is selected, and in step 144 the write operation begins again at the new sector.

Of course, other corrective measures can be taken in response to the high fly write detection signal. As mentioned above, when a high fly write occurs, the write element 34 may also write over parts of adjacent tracks and render data on the adjacent tracks unreadable. This may result in the data on adjacent tracks becoming permanently unrecoverable, thereby severely degrading the reliability of the disk drive 10. In order to reduce the likelihood of this occuring, the write operation can be aborted immediately and the sector marked as bad in response to the first high fly write detection signal arising from that sector.

Furthermore, in accordance with another aspect of the invention, a preamplifier which includes the filter 104 and the threshold detector 108 can terminate the write signal to the write element 34 in response to the high fly write detection signal, independently of the disk controller 112 or other circuitry external to the preamplifier, thereby reducing the time that the write element 34 writes to the disk 12 after the high fly write detection signal occurs. Preferably, the preamplifier is an integrated circuit chip, separate from other circuitry in the disk drive 10, which includes a write driver connected to the write element 34 and a read amplifier connected to the MR read element 44. The write driver converts a digital write signal into a polarity-switching write signal with sufficient current to drive the write element 34, and the read amplifier amplifies the readback signal from the MR read element 44, as is conventional. Advantageously, the preamplifier can contain control logic which prevents the write signal from driving the write element 34, thereby terminating the magnetic flux generated by the write element 34, in response to the high fly write detection signal, independently of any control signals from circuitry external to the preamplifier. In other words, the preamplifier can prevent the write element 34 from writing further to the disk 12 without waiting for the disk controller 112 or other external circuitry to process the high fly write detection signal and send the preamplifier appropriate instructions. Thereafter, the preamplifier can allow a subsequent write signal to drive the write element 34 in response to a control signal from the disk controller 112.

In accordance with another aspect of the invention, the sensitivity of the system 100 to thermally induced signals can be increased by increasing the bias current in the MR read element 44 during the write operation. That is, instead of using the same bias current during the read and write operations, the bias current can be increased during the write operation. Increasing the bias current effectively cubes the thermal sensitivity of the MR read element 44.

More specifically, the readback signal (in volts) is equal to the bias current (I) through the MR read element 44 multiplied by the resistance (R) of the MR read element 44. Furthermore, the change in temperature of the MR read element 44 is proportional to $I^2$. Since the change in resistance is proportional to the change in temperature, the change in resistance is also proportional to $I^2$. Accordingly, by multiplying the current, I, by the change in resistance, which is proportional to $I^2$, the readback signal changes by a value proportional to the current cubed, $I^3$.

Thus, increasing the bias current makes the system 100 more sensitive to changes in flying height. As mentioned above, it is normally desirable to provide a single bias current to the MR read element 44 during read and write operations to ensure that the MR read element 44 is maintained at a relatively steady-state temperature during read operations to avoid unwanted thermally induced signals during read operations. In addition, increasing the bias current tends to reduce the life span of the MR read element 44. However, if greater sensitivity to the thermally induced signal is desired, the bias current can be increased during write operations. Preferably, the bias current is increased by a relatively small amount for a relatively short time period in order to reduce or eliminate unwanted thermal effects and avoid significantly reducing the life span of the MR read element 44.

The readback signal should be used for read operations and the flying height monitoring function after it has reached a steady-state temperature. If, for instance, a typical bias current is increased by 20% for a period of 100 nanoseconds, the MR read element 44 reaches a steady-state temperature in approximately 2 nanoseconds after the bias current is increased, at which point it can be used for the flying height monitoring function. Advantageously, this approach increases the sensitivity of MR read element 44 by about 73% without injecting thermally induced signals due to bias current changes during the flying height monitoring function or significantly reducing the life span of MR read element 44. In addition, when the bias current is subsequently decreased to the baseline bias current used during the read operation, the MR read element 44 rapidly reaches a steady-state temperature to avoid thermal asperities induced by bias current changes during the read operation. Of course, the bias current can be increased by other amounts, such as 50%, depending on factors such as the magnitude of the thermally induced signal, the sensitivity of the threshold detector 108, the ability of the read channel to identify thermal asperities during read operations, and so on.

In the embodiments described above, the thermally induced signal is created by relatively rapid changes to the flying height of the transducer 20. Over time, however, debris may gradually accumulate on the transducer 20 which result in high fly writes without creating a thermally induced signal that exceeds the threshold value of the threshold detector 108. The gradual accumulation of debris on the transducer 20 can be ascertained, for instance, by detecting an increase in the number of retries during servo or data read operations.

In order to overcome the problem of detecting high fly writes due to debris accumulation, thermal signal measurements based on the thermally induced signals generated by the MR read element 44 are taken the first time disk drive 10 becomes operational. Such measurements may be taken over sections of the disk 12 and recorded as reference values on the disk 12 or in non-volatile memory of a host computer. Periodically (for example, every three months), additional measurements can be taken during normal operation of the disk drive 10, and a comparison can be made between the stored reference values and the subsequent measurements. If the differences between the stored reference values and the subsequent measurements exceed a predetermined value, an end user of the disk drive 10 can be notified to back up the data contained in the disk drive 10 and/or bring the disk drive 10 in for servicing. As another alternative, the transducer 20 can be instructed to vibrate in an effort to shake off the accumulated debris. If such vibration is not successful, the aforementioned notification may be provided to the user. Of course, the above are only examples of actions that may be taken.

Figure 8:
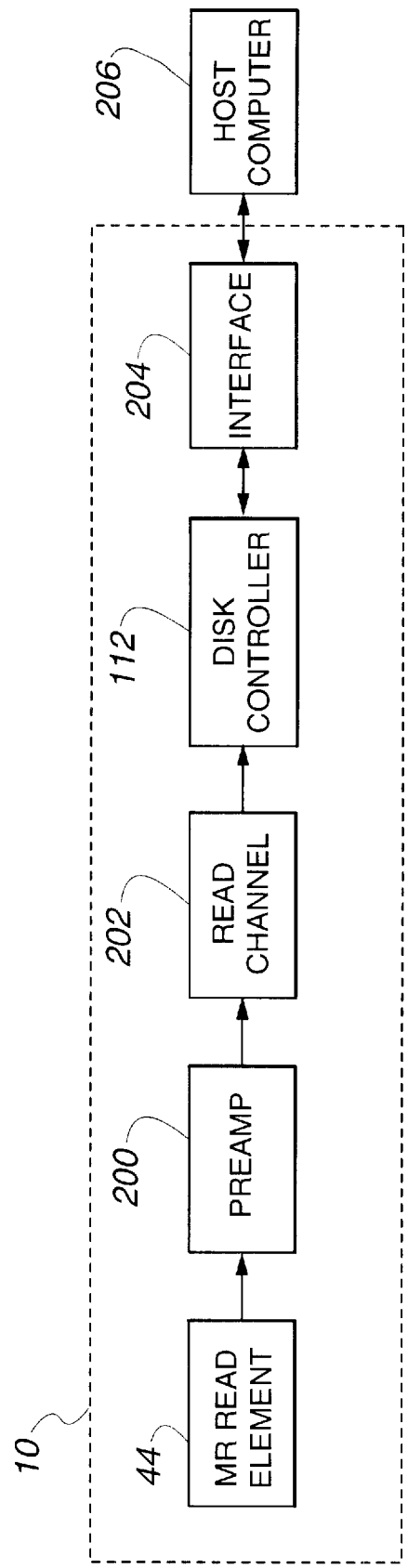
FIG. 8 is a block diagram of components of a disk drive for purposes of illustrating where the filter and threshold detector of the present invention may be located.

FIG. 8 shows portions of the disk drive 10 which include the MR read element 44, a preamplifier 200, a read channel 202, the disk controller 112, and an interface 204. A host computer 206, which is external to the disk drive 10, communicates with the disk drive 10 via the interface 204. The filter 104 and the threshold detector 108 may be located in either the preamplifier 200 or the read channel 202. Of course, these components may placed in other locations in the disk drive 10.

Although the present invention is described in connection with a disk drive, it should be understood that the principles of the present invention are not limited to disk drives. Rather, the principles of the present invention are equally applicable to other data storage devices, such as tape drives, employing MR read elements (and similar components) used for reading information from a storage media.

Furthermore, the present invention has been described in connection with a disk drive which biases the MR read element with a bias current instead of a bias voltage. The present invention is equally applicable to disk drives which employ bias voltages instead of bias currents. If desired, additional hardware can be added to the circuits described herein. For instance, control logic can be added between the threshold detector 108 and the disk controller 112 which receives other warning signals, such as a shock detection signal from a shock sensor, and generates a write unsafe signal (WUS) in response to any of the warning signals. Similarly, the high fly write detection signal can be treated as a write unsafe signal or an interrupt signal by the disk controller 112.

It should also be noted that the thermally induced signal can be evaluated for positive threshold detection, negative threshold detection, or both. Accordingly, the threshold detector can generate a warning signal indicative of a high fly write, a low fly write, or both.

Moreover, the parameters described herein are merely examples. For instance, in other disk drives, the thermally induced signal may have a maximum frequency content of 2 MHz, 1 MHz, or lower, and as the bit transfer rate increases, the flux reversals during the write operation may have a minimum frequency content of 6 MHz, 10 MHz, or higher. The invention is well-suited for disk drives with a variety of data transfer rates, and more particularly, a variety of frequency contents in the thermally induced signal and the magnetically induced signal. In addition, other observed differences between the thermally induced signal and the magnetically induced signal can be used to isolate the thermally induced signal from the magnetically induced signal.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A flying height monitoring system, comprising:
   a recording media for storing information;
   a transducer including a write element for writing information to the recording media and a read element for reading information from the recording media; and
   a monitoring circuit for monitoring a thermally induced signal generated by the read element while the write element is writing information to the recording media.

2. The system of claim 1, wherein the thermally induced signal is related to a temperature of the read element.

3. The system of claim 2, wherein the read element provides a readback signal to the monitoring circuit, and the readback signal includes the thermally induced signal and a magnetically induced signal caused by the write element.

4. The system of claim 3, wherein the monitoring circuit includes a filter that receives the readback signal and separates the thermally induced signal from the magnetically induced signal.

5. The system of claim 4, wherein the thermally induced signal has a lower frequency content than the magnetically induced signal.

6. The system of claim 5, wherein the filter is programmable.

7. The system of claim 5, wherein the filter is located in a preamplifier.

8. The system of claim 5, wherein the filter is located in a read channel.

9. The system of claim 5, wherein the thermally induced signal has a frequency content of at most 3 MHz, and the magnetically induced signal has a frequency content of at least 5 MHz.

10. The system of claim 5, wherein the read element is a magneto-resistive read element.

11. The system of claim 10, wherein the thermally induced signal is caused by the magneto-resistive read element striking an object.

12. The system of claim 11, wherein the object is contamination on a surface of the recording media.

13. The system of claim 11, wherein the object is an aberration in a surface of the recording media.

14. The system of claim 11, wherein the thermally induced signal is a thermal asperity.

15. The system of claim 10, wherein the recording media provides a heat sink for the magneto-resistive read element such that a temperature of the magneto-resistive read element is proportional to the flying height, and the thermally induced signal is caused by a change in the flying height.

16. The system of claim 10, wherein the monitoring circuit includes a threshold detector for determining whether the magnitude of the thermally induced signal exceeds a threshold value.

17. The system of claim 16, wherein the threshold detector generates a signal indicative of a high fly write when the magnitude of the thermally induced signal exceeds the threshold value.

18. The system of claim 17, wherein the threshold value is programmable.

19. The system of claim 10, wherein the recording media is a rotating disk.

20. The system of claim 10, wherein the transducer is in an air bearing slider.

21. A disk drive, comprising:
   a disk for storing information;
   an air bearing slider that includes a transducer, wherein the transducer includes a write element for writing information to the disk during a write operation and a magneto-resistive (MR) read element for reading information from the disk during a read operation, and the MR read element generates a readback signal during the write operation that includes a thermally induced signal caused by thermal changes in the MR read element and a magnetically induced signal caused by magnetic flux applied by the write element to the MR read element;
   a filter for receiving the readback signal from the MR read element and isolating the thermally induced signal from the magnetically induced signal;
   a threshold detector for receiving the thermally induced signal from the filter and generating a warning signal when the thermally induced signal exceeds a threshold value; and
   a controller for modifying the write operation in response to the warning signal.

22. The disk drive of claim 21, wherein the thermally induced signal has a lower frequency content than the magnetically induced signal, and the filter is a low pass filter.

23. The disk drive of claim 22, wherein the thermally induced signal has a frequency content of at most 3 MHz, and the magnetically induced signal has a frequency content of at least 5 MHz.

24. The disk drive of claim 21, wherein the filter is programmable.

25. The disk drive of claim 21, wherein the threshold value is programmable.

26. The disk drive of claim 21, wherein the filter and the threshold detector are located in a preamplifier.

27. The disk drive of claim 26, wherein the preamplifier is an integrated circuit chip external to the controller.

28. The disk drive of claim 27, wherein the preamplifier terminates a write signal to the write element in response to the warning signal and independently of the controller, thereby preventing the write element from applying the magnetic flux to the disk.

29. The disk drive of claim 28, wherein the preamplifier terminates the write signal to the write element in response to the warning signal and independently of any control signal received by the preamplifier from circuitry external to the preamplifier.

30. The disk drive of claim 29, wherein after the preamplifier terminates the write signal, the preamplifier provides another write signal to the write element in response to a control signal received by the preamplifier from circuitry external to the preamplifier.

31. The disk drive of claim 21, wherein the filter and the threshold detector are located in a read channel.

32. The disk drive of claim 21, wherein the thermally induced signal is a thermal asperity.

33. The disk drive of claim 32, wherein the thermal asperity is caused by the MR read element striking an object.

34. The disk drive of claim 21, wherein the disk provides a heat sink for the MR read element such that a temperature of the MR read element is related to a flying height of the MR read element, and the thermally induced signal is caused by a change in the flying height of the MR read element.

35. The disk drive of claim 21, wherein a single bias current is applied to the MR read element during the read and write operations.

36. The disk drive of claim 21, wherein a first bias current is applied to the MR read element during the read operation, and a second bias current greater than the first bias current is applied to the MR read element during the write operation.

37. The disk drive of claim 21, wherein the warning signal is an interrupt signal.

38. The disk drive of claim 21, wherein the warning signal is a high fly write detection signal.

39. The disk drive of claim 21, wherein the warning signal is a low fly write detection signal.

40. The disk drive of claim 21, wherein the warning signal is either a high fly write detection signal or a low fly write detection signal.

41. The disk drive of claim 21, wherein the controller modifies the write operation in response to an interrupt signal generated by control logic, the control logic generates the interrupt signal in response any of a plurality of signals, and the plurality of signals includes the warning signal.

42. The disk drive of claim 41, wherein the plurality of signals includes a shock detection signal from a shock sensor.

43. The disk drive of claim 21, wherein the controller modifies the write operation by preventing the write element from writing to the disk while the thermally induced signal exceeds the threshold value.

44. The disk drive of claim 21, wherein the controller modifies the write operation by repeating the write operation after the thermally induced signal no longer exceeds the threshold value.

45. The disk drive of claim 44, wherein the controller modifies the write operation by writing to a same sector of the disk that was written to during the write operation.

46. The disk drive of claim 44, wherein the controller modifies the write operation by marking a sector of the disk that was written to during the write operation as defective and writing to a different sector of the disk.

47. The disk drive of claim 21, wherein the controller modifies the write operation by reading the information written to the disk during the write operation, performing a read verification operation, and repeating the write operation if the read verification operation indicates an error.

48. The disk drive of claim 21, wherein the controller stores a first set of data related to the thermally induced signal provided by the MR read element at a first time, the controller stores a second set of data related to the thermally induced signal provided by the MR read element at a second time, and the controller compares the first and second sets of data to determine whether debris has accumulated on the transducer.

49. The disk drive of claim 48, wherein the controller causes the transducer to vibrate in an effort to remove the accumulated debris from the transducer when the controller determines that debris has accumulated on the transducer.

50. The disk drive of claim 48, wherein the controller notifies a user when the controller determines that debris has accumulated on the transducer.

51. A disk drive, comprising:
a disk for storing information;
an air bearing slider designed to fly above the disk during read and write operations, wherein the slider includes a transducer, the transducer includes a write element for writing information to the disk during a write operation and a magneto-resistive (MR) read element for reading information from the disk during a read operation, and the MR read element generates an analog voltage signal with a relatively low frequency content thermally induced signal caused by the MR read element striking an object proximate to the disk and a relatively high frequency content magnetically induced signal caused by the MR read element receiving magnetic flux from the write element during the write operation;
a low pass filter for receiving the analog voltage signal from the MR read element during the write operation and isolating the thermally induced signal from the magnetically induced signal;
a threshold detector for receiving the thermally induced signal from the filter, comparing a magnitude of the thermally induced signal with a threshold value, and generating a high fly write detection signal when the thermally induced signal exceeds the threshold value; and
a controller for modifying the write operation in response to the high fly write detection signal.

52. The disk drive of claim 51, wherein the thermally induced signal has a frequency content of at most 3 MHz, and the magnetically induced signal has a frequency content of at least 5 MHz.

53. The disk drive of claim 51, wherein the filter is programmable.

54. The disk drive of claim 51, wherein the threshold value is programmable.

55. The disk drive of claim 51, wherein the filter and the threshold detector are located in a preamplifier.

56. The disk drive of claim 55, wherein the preamplifier is an integrated circuit chip external to the controller, the preamplifier amplifies a read signal from the MR read element during the read operation, and the preamplifier terminates a write signal to the write element thereby preventing the write element from applying the magnetic flux to the disk in response to the high fly write detection signal and independently of any control signal received by the preamplifier from circuitry external to the preamplifier.

57. The disk drive of claim 51, wherein a single bias current is applied to the MR read element during the read and write operations.

58. The disk drive of claim 51, wherein a first bias current is applied to the MR read element during the read operation, and a second bias current greater than the first bias current is applied to the MR read element during the write operation thereby increasing a sensitivity of the MR read element to thermal changes in the MR read element.

59. The disk drive of claim 51, wherein the controller modifies the write operation by preventing the write element from writing to the disk while the thermally induced signal exceeds the threshold value.

60. The disk drive of claim 51, wherein the controller stores a first set of data related to the thermally induced signal provided by the MR read element at a first time, the controller stores a second set of data related to the thermally induced signal provided by the MR read element at a second time, and the controller compares the first and second sets of data to determine whether debris has accumulated on the transducer.

* * * * *